United States Patent
Ooura et al.

(10) Patent No.: US 7,112,637 B2
(45) Date of Patent: Sep. 26, 2006

(54) PROCESS FOR PRODUCING VINYL CHLORIDE POLYMER

(75) Inventors: Makoto Ooura, Kamisu (JP); Tadashi Amano, Kamisu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/561,962

(22) PCT Filed: Dec. 21, 2004

(86) PCT No.: PCT/JP2004/019113

§ 371 (c)(1),
(2), (4) Date: Dec. 22, 2005

(87) PCT Pub. No.: WO2005/063824

PCT Pub. Date: Jul. 14, 2005

(65) Prior Publication Data

US 2006/0173146 A1    Aug. 3, 2006

(30) Foreign Application Priority Data

Dec. 26, 2003   (JP) .............................. 2003-434504

(51) Int. Cl.
  *C08F 2/18* (2006.01)
  *C08F 14/06* (2006.01)
(52) U.S. Cl. .................... 526/81; 526/86; 526/230.5; 526/232; 526/344.2
(58) Field of Classification Search .................. 526/81, 526/86, 230.5, 232, 344.2
See application file for complete search history.

(56) References Cited

U.S. PATENT DOCUMENTS

| 4,985,524 A | * | 1/1991 | Amano et al. | ........... 526/344.2 |
| 5,100,988 A | * | 3/1992 | Amano et al. | ........... 526/344.2 |
| 5,357,011 A |   | 10/1994 | Ohnishi et al. | |

FOREIGN PATENT DOCUMENTS

| JP | 1-158008 | 6/1989 |
| JP | 1-292001 | 11/1989 |
| JP | 7-82304 | 3/1995 |
| JP | 2003-137909 | 5/2003 |

* cited by examiner

*Primary Examiner*—Fred Teskin
(74) *Attorney, Agent, or Firm*—Oblon, Spivak, McClelland, Maier & Neustadt, P.C.

(57) ABSTRACT

There is provided a process for producing a vinyl chloride-based polymer, in which a suspension polymerization of either vinyl chloride monomer, or a mixture of vinyl chloride monomer and another copolymerizable monomer, is conducted in a polymerization vessel fitted with a reflux condenser, the process including the steps of:

(A) adding to the reaction mixture a high-activity, oil-soluble polymerization initiator, with a 10-hour half life temperature of no more than 40° C. at a concentration of 0.1 mol/L in benzene, for a specified time within a period from the commencement of heat removal using the reflux condenser through to completion of the polymerization, (B) adding water either continuously or intermittently to the reaction mixture through the supply pipe for the polymerization initiator, at least during the period from the commencement of addition of the high-activity, oil-soluble polymerization initiator through to completion of that addition, and (C) passing steam through the supply pipe following completion of the addition of the water. According to the present invention, the process for producing a vinyl chloride-based polymer by aqueous suspension polymerization in a polymerization vessel fitted with a reflux condenser can be improved, the heat removal capability can be utilized effectively to shorten the polymerization time, and a high quality vinyl chloride-based polymer with an extremely low level of fish eyes can be produced.

8 Claims, 1 Drawing Sheet

PROCESS FOR PRODUCING VINYL CHLORIDE POLYMER

TECHNICAL FIELD

The present invention relates to a process for producing a vinyl chloride-based polymer, and more particularly to a process for producing a vinyl chloride-based polymer by suspension polymerization which enables the stable production of a high quality polymer with minimal fish eyes, at a high level of productivity.

BACKGROUND ART

Suspension polymerization of either vinyl chloride monomer, or a mixture of vinyl chloride monomer and another copolymerizable monomer, is generally conducted in the following manner. A polymerization vessel fitted with a reflux condenser, a jacket, and a cooling baffle or coil or the like is charged with an aqueous medium, a dispersant (a suspension agent), and a polymerization initiator, as well as various other additives, as required. Subsequently, hot water is passed through the jacket to increase the temperature inside the polymerization vessel to a predetermined polymerization reaction temperature, thereby initiating polymerization. By subsequently passing cold water through the jacket, baffle, coil, and reflux condenser to remove the heat generated by the polymerization reaction, the polymerization reaction is allowed to proceed with the temperature inside the polymerization vessel maintained at a predetermined reaction temperature.

In recent years, attempts have been made to improve productivity by shortening the polymerization time. One method of shortening the polymerization time involves increasing the quantity of polymerization initiator added, thereby increasing the polymerization reaction rate. However, the ability to remove heat from the polymerization vessel is limited, and the quantity of polymerization initiator can only be increased within the bounds allowed by this heat removal capability. As a result, there are limits to how much the polymerization time can be shortened using this method.

One example of a proposed process that enables shortening of the polymerization time is a process in which, by combining a high-activity polymerization initiator and a low-activity polymerization initiator, the reaction rate can be controlled at both the initial stages of polymerization and the closing stages of polymerization, thereby reducing the polymerization time (patent reference 1). According to this process, the heat removal capability of the polymerization vessel can be utilized effectively in the initial stages and closing stages of the polymerization, but in the middle stages of the polymerization, the heat removal capability is excessive, and can not be effectively utilized. This tendency is particularly marked in those cases where a reflux condenser is used as one of the heat removal devices.

Another proposed process that enables further shortening of the polymerization time is a process in which a high-activity, oil-soluble polymerization initiator is added in the period following commencement of heat removal using the reflux condenser, through until a certain polymerization conversion rate is reached (patent reference 2). According to this process, the heat removal capability of the polymerization vessel can be used effectively, and the vinyl chloride-based polymer can be produced with good productivity. However in this process, the high-activity, oil-soluble polymerization initiator added during the polymerization requires some time to disperse uniformly through the reaction mixture inside the polymerization vessel, meaning the concentration of the polymerization initiator develops an uneven distribution, which causes an increase in the number of fish eyes in the product polymer. Furthermore, because the high-activity, oil-soluble polymerization initiator is added to the polymerization vessel, containing the unreacted monomer, over a long period during the polymerization, polymer scale tends to adhere to the inside of, and the region around the outlet of, the supply pipe for the high-activity, oil-soluble polymerization initiator. As a result, the pipe can sometimes become blocked. Furthermore, because the adhered scale can break away and become incorporated within the polymer, the level of fish eyes within the product tends to increase.

Patent Reference 1: Japanese Laid-open publication (kokai) No. Hei 6-166704

Patent Reference 2: Japanese Laid-open publication (kokai) No. Hei 7-82304

DISCLOSURE OF INVENTION

Problems Invention Aims to Solve

Accordingly, an object of the present invention is to improve the process for producing a vinyl chloride-based polymer by suspension polymerization of either vinyl chloride monomer, or a mixture of vinyl chloride monomer and another copolymerizable monomer, in a polymerization vessel fitted with a reflux condenser, thereby providing a process for producing a vinyl chloride-based polymer which enables the heat removal capability to be utilized effectively and the polymerization time to be shortened, and which yields a high quality polymer with extremely low levels of fish eyes.

Means for Solution of the Problems

In order to achieve this object, the present invention provides a process for producing a vinyl chloride-based polymer, wherein a suspension polymerization of either vinyl chloride monomer, or a mixture of vinyl chloride monomer and another copolymerizable monomer, is conducted in a polymerization vessel fitted with a reflux condenser, the process comprising the steps of:

(A) adding to the reaction mixture a high-activity, oil-soluble polymerization initiator, with a 10-hour half life temperature of no more than 40° C. at a concentration of 0.1 mol/L in benzene, for a specified time within the period from commencement of heat removal using the reflux condenser through to completion of the polymerization, (B) adding water either continuously or intermittently to the reaction mixture through the supply pipe for the polymerization initiator, at least during the period from commencement of addition of the high-activity, oil-soluble polymerization initiator through to completion of that addition, and (C) passing steam through the supply pipe following completion of addition of the water.

EFFECTS OF INVENTION

According to the process of the present invention, the heat removal capability of the polymerization vessel can be utilized effectively during the polymerization period, and the polymerization time can be shortened. The quantity of polymerization initiator remaining within the product polymer can be reduced, and the generation of polymer scale in the polymerization initiator supply pipe can be prevented, meaning a product with extremely low levels of fish eyes and initial discoloration (the property wherein discoloration occurs on molding of the polymer) can be obtained.

Figure 1:
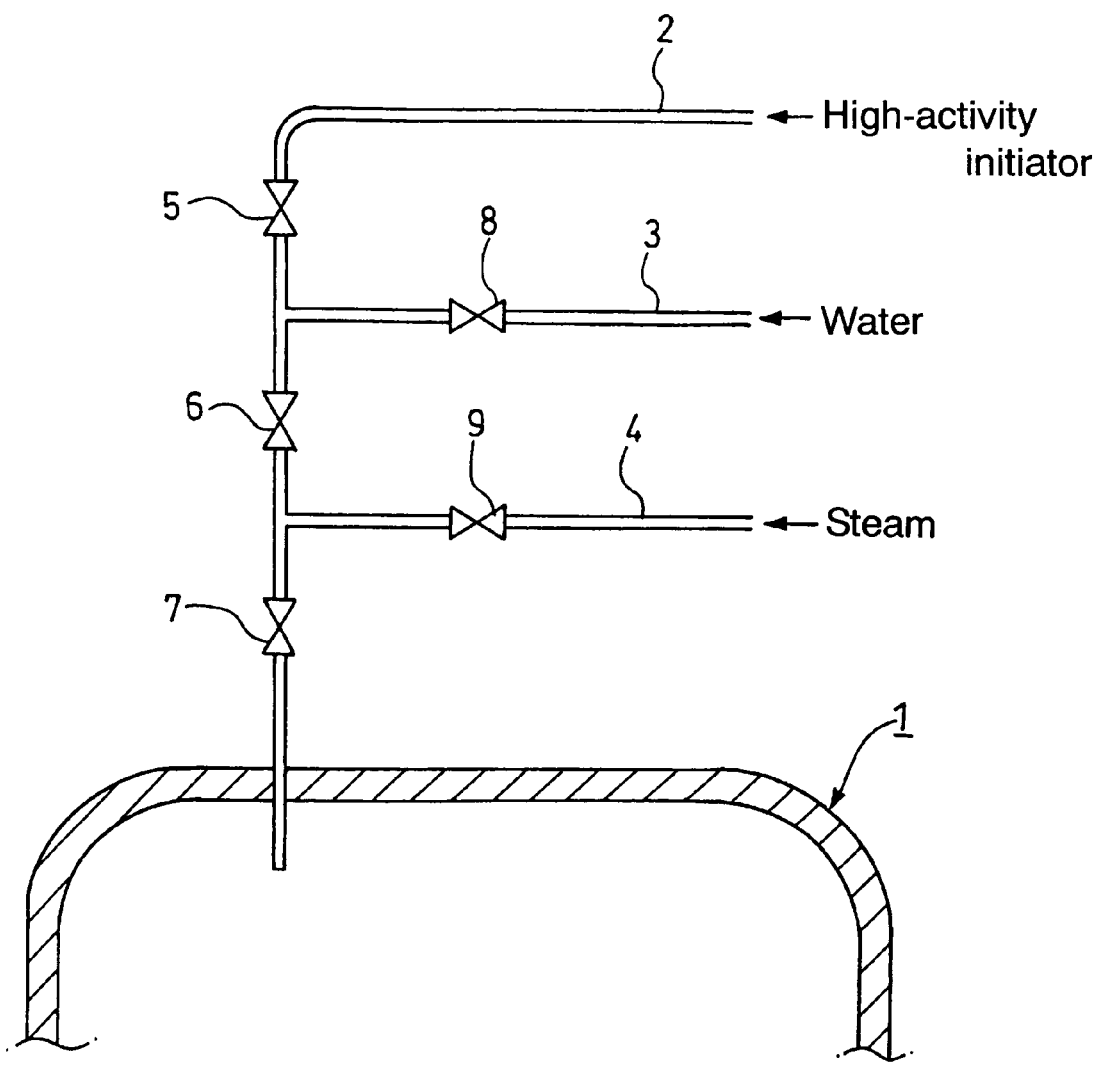
[FIG. 1]

A diagram showing one example of a supply pipe installation of the present invention.

DESCRIPTION OF REFERENCE SYMBOLS

| | |
|---|---|
| 1 | Polymerization vessel |
| 2 | High-activity initiator supply pipe |
| 3 | Water supply pipe |
| 4 | Steam cleaning pipe |
| 5 to 9 | Valves |

BEST MODE OF CARRYING OUT THE INVENTION

As follows is a more detailed description of the present invention based on a series of embodiments.

(A) Addition of High-Activity, Oil-Soluble Polymerization Initiator

In a suspension polymerization of vinyl chloride monomer or a monomer mixture that includes vinyl chloride, generally, the polymerization vessel is charged with an aqueous medium, a dispersant (a suspension agent), a polymerization initiator, and various other additives as required, and hot water is then passed through the jacket to increase the temperature inside the polymerization vessel to a predetermined polymerization reaction temperature, thereby initiating polymerization. By subsequently removing the heat generated by the polymerization reaction using cooling devices such as a reflux condenser, the polymerization reaction is allowed to proceed with the reaction mixture inside the polymerization vessel maintained at a predetermined reaction temperature. In the process of the present invention, the polymerization reaction is typically conducted at a temperature of 35 to 75° C., and preferably from 45 to 70° C.

A first characteristic feature of the present invention is the addition to the reaction mixture, for a specified time within the period from commencement of heat removal using the reflux condenser through to completion of the polymerization, of a high-activity, oil-soluble polymerization initiator (hereafter referred to as the high-activity initiator), with a 10-hour half life temperature of no more than 40° C. at a concentration of 0.1 mol/L in benzene.

In this description, the half life of the polymerization initiator refers to the time required for the concentration of the polymerization initiator to fall to ½ of its initial value. The decomposition reaction of the polymerization initiator at any particular temperature can be considered a first-order reaction, so that at a certain temperature, a relationship represented by the following formula applies:

$$\log(a/x) = (k/2.303)t$$

(wherein, x represents the concentration (mol/liter) of the initiator at a time t, a represents the initial concentration (same units) of the initiator, k represents the decomposition rate constant determined by the temperature, and t represents the time). By plotting a against t, the value of k at that temperature can be determined. By inserting the thus obtained value of k into the following formula:

$$t_{1/2}(\text{half life}) = (ln2)/k$$

the half life at that temperature can be determined. The "10-hour half life temperature at a concentration of 0.1 mol/L in benzene" used in the present invention refers to the temperature which results in a half life of 10 hours when the polymerization initiator is dissolved in benzene at the specified concentration and the resulting solution is then sealed inside a container and allowed to stand at that temperature.

Examples of high-activity initiators for which the 10-hour half life temperature at a concentration of 0.1 mol/L in benzene is no more than 40° C. include acetylcyclohexylsulfonyl peroxide (10-hour half life temperature at a concentration of 0.1 mol/L in benzene: 26.5° C.), isobutyryl peroxide (32.5° C.), α-cumyl peroxyneodecanoate (36.6° C.), diisopropylbenzene (36.4° C.), diallyl peroxycarbonate (38.3° C.), and 3-hydroxy-1,1-dimethylbutyl peroxyneodecanoate (37° C.), and these compounds can be used either alone, or in combinations of two or more different compounds. Of these high-activity initiators, isobutyryl peroxide, α-cumyl peroxyneodecanoate, and 3-hydroxy-1,1-dimethylbutyl peroxyneodecanoate are preferred, and isobutyryl peroxide is particularly desirable.

According to the present invention, the high-activity initiator is added to the reaction mixture across a specified time period (hereafter also referred to as the "high-activity initiator addition period") within the period from commencement of heat removal using the reflux condenser through to completion of the polymerization. Heat removal using the reflux condenser is usually conducted so as not to cause rapid changes in the temperature inside the polymerization vessel or the jacket temperature, and to avoid any effects on foaming of the mixture inside the polymerization vessel, meaning the quantity of heat removed is normally increased gradually from the commencement of condenser heat removal, through until a predetermined heat removal quantity is reached. Commencement of addition of the high-activity initiator must be no earlier than the commencement of heat removal using the reflux condenser. In other words, addition may commence at the same time that heat removal using the reflux condenser is commenced, immediately after commencement of heat removal, or at a specified time after the commencement of heat removal. Commencement of the addition immediately after the commencement of heat removal means within 10 minutes of the commencement of heat removal. Addition of the high-activity initiator is preferably commenced either simultaneously with the commencement of heat removal, or immediately after the commencement of heat removal. Furthermore, although the addition of the high-activity initiator may be continued until the completion of the polymerization, the addition is preferably halted prior to the polymerization conversion rate reaching 75%, and even more preferably prior to the polymerization conversion rate reaching 60%. Even if addition is continued once the polymerization conversion rate has exceeded 75%, the polymerization time shortening effect generated by the additional quantity diminishes, making further addition uneconomic.

In the present invention, the completion of the polymerization is the point at which the polymerization reaction is halted by addition, to the mixture inside the polymerization vessel, of a sufficient quantity of a polymerization inhibitor (a material with polymerization inhibiting properties) to halt the polymerization reaction. After this addition, the recovery of any unreacted monomer is usually commenced.

Those inhibitors typically used in vinyl chloride-based polymer production can be used as the polymerization inhibitor. Specific examples of suitable inhibitors include phenol-based compounds such as 2-t-butylphenol, 2-t-aminophenol, 2,4-dimethyl-6-tert-butylphenol, 2,6-diisopropyl-p-cresol, n-octadecyl-3-(3,5-di-t-butyl-4-hydroxyphenyl) propionate, 3,5-di-t-butyl-4-hydroxytoluene, triethylene glycol-bis-[3-(3-t-butyl-5-methyl-4-hydroxyphenyl) propionate], t-butylhydroxyanisole, t-butylhydroquinone, 4,4'-butylidenebis(3-methyl-6-t-butylphenol), 2,2'-methylene-bis(4-methyl-6-t-butylphenol), 2,2'-methylene-bis(4-ethyl-6-t-butylphenol), 2,6-di-t-butyl-4-methylphenol, 2,6-di-t-butyl-4-ethylphenol, 2,6-di-t-butyl-4-hydroxymethylphenol, 4,4'-methylenebis(2,6-di-t-butylphenol), 4,4'-thiobis(6-t-butyl-m-cresol), and tetrakis[methylene-3-(3,5-di-t-butyl-4-hydroxyphenyl) propionate]methane; phosphorus compounds such as cyclic neopentanetetraylbis(octadecylphosphite); sulfur compounds such as dilauryl thiodipropionate, dimyristyl thiodipropionate, distearyl thiodipropionate, alkali metal sulfates, alkali metal hydrogensulfites, and alkali metal thiosulfates; and nitrogen compounds such as N,N-diethylhydroxylamine and sodium nitrite. These polymerization inhibitors can be used either alone, or in combinations of two or more different compounds. Of the above compounds, from the viewpoints of limiting scale adhesion to the polymerization vessel and achieving good anti-initial discoloration for the product polymer, n-octadecyl-3-(3,5-di-t-butyl-4-hydroxyphenyl) propionate, 3,5-di-t-butyl-4-hydroxytoluene, triethylene glycol-bis[3-(3-t-butyl-5-methyl-4-hydroxyphenyl) propionate], 2,2'-methylene-bis(4-ethyl-6-t-butylphenol), 4,4'-butylidenebis(3-methyl-6-t-butylphenol), t-butylhydroxyanisole, t-butylhydroquinone, and N,N'-diethylhydroxylamine are preferred.

The quantity added of the polymerization inhibitor is typically within a range from 0.001 to 0.3 parts by mass, and preferably from 0.003 to 0.1 parts by mass, and even more preferably from 0.005 to 0.05 parts by mass, per 100 parts by mass of the monomer or monomer mixture.

As a result of this characteristic feature (A), the heat removal capability of the polymerization vessel can be utilized effectively throughout the polymerization time, and the polymerization time can be shortened. If addition of the high-activity initiator is commenced prior to commencement of heat removal using the reflux condenser, then the polymerization reaction heat becomes excessively large and exceeds the heat removal capability of the polymerization vessel, making it impossible to maintain the temperature inside the polymerization vessel at the predetermined temperature, and causing problems in the product polymer such as an increase in the occurrence of fish eyes.

The quantity added of the high-activity initiator can be set appropriately in accordance with factors such as the quantity of any other polymerization initiators added to the polymerization vessel after polymerization initiation, and the total heat removal capability of the polymerization vessel being used, but is typically within a range from 0.0001 to 0.2 parts by mass, and preferably from 0.001 to 0.1 parts by mass, per 100 parts by mass of the monomer or monomer mixture (the total quantity of monomer supplied to the polymerization, including the vinyl chloride monomer, and where used, any other copolymerizable monomers). A quantity that falls within this range is preferred in terms of the initial discoloration property of the product polymer, and the polymerization time shortening effect achieved.

The rate of addition for the high-activity initiator can be set appropriately in accordance with factors such as the quantity of other polymerization initiators used after polymerization initiation, and the total heat removal capability of the polymerization vessel being used, but is typically within a range from 0.3 to 5% by mass, and preferably from 0.5 to 3% by mass, of the entire quantity of the initiator per minute. If the rate of addition for the high-activity initiator is too high, then the quantity of heat generated by the polymerization reaction increases rapidly, which can cause problems such as the heat removal capability of the polymerization vessel becoming inadequate, making it impossible to control the temperature inside the polymerization vessel at a constant value. Furthermore, if the rate of addition for the high-activity initiator is too low, then the unutilized fraction of the reflux condenser heat removal capability immediately following the commencement of heat removal using the condenser increases, causing a worsening of the heat removal efficiency, and diminishing the polymerization time shortening effect. Furthermore, the addition rate for the high-activity initiator may be adjusted in accordance with the heat removal capability of the polymerization vessel. Provided the high-activity initiator is added essentially continuously throughout the high-activity initiator addition period, at an addition rate specified above, then the actual mode of addition may be either continuous or intermittent. Furthermore, the physical state of the added high-activity initiator may be either a solution generated by dilution in an organic solvent, or an emulsion or suspension generated by dispersion of the initiator in an aqueous medium, although a dispersion within an aqueous medium is preferred. Aqueous emulsions are particularly preferred.

An aqueous emulsion of the high-activity initiator can be prepared by mechanically emulsifying the initiator and water. An emulsifying agent is usually used to improve the stability of the emulsion. Furthermore, in order to prevent freezing at low temperatures, a water-soluble alcohol with a molecular weight of no more than 100 is preferably added. More specifically, the emulsion can be prepared, for example, by a method in which a mixed liquid, formed by dissolving or dispersing an emulsifying agent and a water-soluble alcohol with a molecular weight of no more than 100 in water, is added to the high-activity initiator with stirring, or a method in which the initiator is added to the aqueous solution. The emulsifying agent may also be dissolved in the high-activity initiator.

In the preparation of an aqueous emulsion of the high-activity initiator, a high-activity initiator that has been diluted with a diluent may also be used. Examples of suitable diluents include organic solvents such as benzene, toluene, and aliphatic hydrocarbons, as well as plasticizers such as dimethyl phthalate and dioctyl phthalate. The quantity of the diluent typically accounts for no more than 40% by mass of the aqueous emulsion.

The quantity of the high-activity initiator within the aqueous emulsion described above is typically from 5 to 80% by mass, and for practical purposes, is preferably from 10 to 65% by mass.

The water-soluble alcohol added to prevent freezing is preferably an alcohol with a molecular weight of no more than 100. Examples of suitable alcohols include methyl alcohol, ethyl alcohol, n-propyl alcohol, isopropyl alcohol, ethylene glycol, and glycerol. The concentration of the water-soluble alcohol within the aqueous emulsion is typically within a range from 2% by mass to 30% by mass, although concentrations exceeding 10% by mass are preferred, as they enable the freezing point of the aqueous emulsion to be lowered to −25° C. or lower, and enable a low viscosity to be achieved at low temperatures.

The emulsifying agent used in the preparation of the aqueous emulsion may be one or more emulsifying agents selected from the group consisting of anionic surfactants, cationic surfactants, non-ionic surfactants, and dispersants, provided the agent does not effect the physical properties of the product polymer. Of these emulsifying agents, the use of a combination of a non-ionic surfactant and a dispersant described below is the most preferred, as such combinations produce excellent stability of the high-activity initiator aqueous emulsion, and also yield favorable properties for the product polymer.

The above non-ionic surfactant is preferably a polyhydric alcohol ester of a fatty acid of 10 to 22 carbon atoms, and suitable examples include the various mono-, di-, and tri-sorbitan fatty acid esters, the various mono-, di-, tri-, tetra-, and poly saccharose fatty acid esters, the various mono-, di-, and tri-glycerol fatty acid esters, the various mono- and di-propylene glycol fatty acid esters, the various mono-, di-, tri-, tetra-, and poly sorbitol fatty acid esters, and the various mono-, di-, tri-, and tetra-pentaerythritol fatty acid esters. Here, the term "fatty acid" refers to a fatty acid such as oleic acid, lauric acid, palmitic acid, or stearic acid. A polyhydric alcohol fatty acid ester using one or more of these fatty acids is used, and if blending is conducted so that the HLB value of the surfactant mixture is within a range from 1 to 10, then stable, fine emulsified particles are generated within the aqueous emulsion. The quantity added of the non-ionic surfactant typically accounts for 0.01 to 10% by mass of the high-activity initiator aqueous emulsion. Quantities from 0.1 to 5% by mass are preferred. Specific examples of suitable commercially available non-ionic surfactants include Monogly MB, Nonion OP-80R, and Nonion OP-85R manufactured by NOF Corporation, and Rikemal PO-100 and Rikemal 0-71-D manufactured by Riken Vitamin Co., Ltd.

Furthermore, suitable examples of the aforementioned dispersant include guar gum, locust bean gum, Abelmoschus manihot, tragacanth gum, gum arabic, viscose, methyl cellulose, ethyl cellulose, hydroxyethyl cellulose, carboxymethyl cellulose, soluble starch, carboxymethyl starch, dialdehyde starch, polyvinyl alcohol, sodium polyacrylate, and partially or completely saponified polyvinyl acetate. One or more of these dispersants can be used.

The preparation of the aqueous emulsion of the high-activity initiator can be conducted using conventional apparatus. For example, paddle-type, propeller-type, or turbine-type mechanical rotational mixers, colloid mills, homogenizers, high-speed shear devices, line mixers, and ultrasound homogenizers can be used.

(B) Addition of Water

A second characteristic feature of the present invention is the continuous or intermittent addition of water to the reaction mixture through the supply pipe for the polymerization initiator, at least throughout the aforementioned high-activity initiator addition period (namely, the period from addition commencement through to addition completion).

Examples of the water that is used include deionized water, tap water, industrial water, and soft water, although deionized water is preferred.

The period over which the water is added may be any period that includes the period during which the high-activity initiator is supplied. In other words, addition of the water may be commenced prior to the commencement of addition of the high-activity initiator, and may be continued after completion of the high-activity initiator addition. The water may also be added continuously from initiation through to completion of the polymerization. From the viewpoint of preventing scale adhesion inside, and in the region around the outlet of, the high-activity initiator supply pipe, the addition of the water is preferably commenced prior to the commencement of heat removal using the reflux condenser, and is preferably continued for at least 10 minutes after the completion of supply of the high-activity initiator, before being halted.

There are no particular restrictions on the rate of water addition, although from the viewpoint of ensuring favorable fish eye reduction and scale adhesion prevention effects, the flow rate of the water is preferably at least 200 g/min·cm$^2$, and even more preferably 400 g/min·cm$^2$ or greater, through a cross-section of the high-activity initiator supply pipe. If this flow rate is too small, then the adhesion of scale inside, and in the region around the outlet of, the high-activity initiator supply pipe becomes more likely. This results in an increased likelihood of certain problems, including blockage of the pipe as the number of batches accumulates, and an increase in fish eyes in the product polymer caused by adhered scale breaking away and becoming incorporated within the polymer. There are no particular restrictions on the upper limit for the flow rate, although for practical reasons, the flow rate is typically no more than 3,000 g/min·cm$^2$, and is preferably 1,000 g/min·cm$^2$ or less.

There are no particular restrictions on the quantity of water added, although in order to ensure that the fill ratio of the reaction mixture inside the polymerization vessel, that is, the ratio of the volume of the liquid reaction mixture relative to the internal volume of the polymerization vessel, does not become overly large, the quantity added is preferably no more than the volumetric shrinkage associated with the progression of the polymerization reaction. The above fill ratio is preferably maintained within a range from 60 to 90%, and is even more preferably held within a range from 70 to 90%.

There are no particular restrictions on the temperature of the water, although the temperature is preferably within a range from 5 to 50° C., and even more preferably from 10 to 40° C.

(C) Cleaning of the High-Activity Initiator Supply Pipe Using Steam

A third characteristic feature of the present invention is the passage of steam through the aforementioned high-activity initiator supply pipe following completion of the addition of water, thereby decomposing and cleaning any residual high-activity initiator, either near the point where the supply pipe exits into the polymerization vessel, or in any other location where there is a possibility of the pipe making contact with gaseous monomer.

This cleaning operation using steam is preferably conducted immediately following completion of the water addition. There are no particular restrictions on the time of this steam cleaning operation, although typically the time is within a range from 10 to 180 seconds, and preferably from 20 to 120 seconds. If the cleaning time is too short, then the scale adhesion prevention effect is inadequate. In contrast, if the cleaning time is too long, the high-activity initiator supply pipe can become overheated, which can cause degradation of initiator located outside those regions where the pipe contacts the gaseous monomer, and can also cause a deterioration in stability.

There are no particular restrictions on the steam flow rate, although in order to ensure satisfactory cleaning of the high-activity initiator supply pipe, the flow rate is preferably at least 1,000 g/min·cm² through a cross-section of the supply pipe. There are no particular restrictions on the upper limit for this flow rate, although for practical reasons, the flow rate is typically no more than 7,000 g/min·cm².

Provided satisfactory cleaning of the high-activity initiator supply pipe can be achieved, the steam may be either saturated water vapor or superheated water vapor.

There are no particular restrictions on the temperature of the steam, provided the resulting scale adhesion prevention effect is satisfactory. The temperature of the steam inside the pipe (the steam cleaning pipe) used for supplying the steam to the high-activity initiator supply pipe is preferably at least 120° C., and is even more preferably 130° C. or higher. Furthermore, for practical reasons, the temperature is typically no more than 280° C.

There are no particular restrictions on the steam pressure, provided the resulting scale adhesion prevention effect is satisfactory. The pressure inside the aforementioned steam cleaning pipe, measured when supply of the steam to the high-activity initiator supply pipe has been halted, is preferably within a range from 0.1 to 3 MPa·G, and even more preferably from 0.1 to 1 MPa·G.

In order to ensure that the scale adhesion prevention effect provided by the steam manifests satisfactorily, the inner surface temperature of the portion of the high-activity initiator supply pipe between the point of intersection with the steam cleaning pipe and the pipe outlet into the polymerization vessel is preferably at least 70° C., and is even more preferably 80° C. or higher. Furthermore, for practical reasons, this inner surface temperature is typically no more than 200° C.

—Supply Pipe and Steam Pipe Installations—

In the supply pipe installation for the high-activity initiator and the water, the water is preferably able to be added continuously or intermittently to the reaction mixture inside the polymerization vessel through the high-activity initiator supply pipe. Furthermore, the steam pipe installation is preferably constructed so that the high-activity initiator supply pipe is able to be cleaned using the steam. One example of a supply pipe installation of the present invention is shown in FIG. 1. Those elements such as the stirrer and reflux condenser, which are not directly related to this description, have been omitted. In FIG. 1, a water supply pipe 3 is interconnected with a high-activity initiator supply pipe 2. As a result, the water can be added continuously or intermittently to the reaction mixture inside the polymerization vessel 1 via the high-activity initiator supply pipe 2. Furthermore, a steam cleaning pipe 4 is also interconnected with the high-activity initiator supply pipe 2. As a result, the high-activity initiator supply pipe 2 can be subjected to steam cleaning.

—Other Conditions—

There are no particular restrictions on the other conditions associated with the process of the present invention, and the conditions employed in conventional aqueous suspension polymerization reactions of either vinyl chloride monomer, or a monomer mixture comprising vinyl chloride as the primary component, can be used.

—Polymerization Vessel

A polymerization vessel used in conducting the process of the present invention comprises a reflux condenser as a cooling device. The polymerization vessel usually also comprises a jacket for heating and cooling, and although not essential, preferably also comprises a baffle or a coil or the like with cooling capabilities.

Furthermore, the polymerization vessel may also comprise a so-called external heat exchange device, in which the mixed slurry inside the polymerization vessel is extracted with a pump, passed through a heat exchanger disposed outside the polymerization vessel, and then returned to the polymerization vessel.

Heat removal by the reflux condenser is commenced once the temperature of the mixture inside the polymerization vessel has reached a predetermined polymerization reaction temperature, and in order not to cause rapid changes in the temperature of the mixture inside the polymerization vessel or the jacket temperature, the quantity of heat removed is increased gradually until a predetermined heat removal quantity is reached, and this heat removal quantity is then maintained. The time required from the commencement of heat removal using the reflux condenser until the predetermined heat removal quantity is reached is typically from 5 to 120 minutes, and preferably from 15 to 60 minutes. Furthermore, after the predetermined heat removal quantity has been reached, the quantity of heat removed by the reflux condenser may still be altered at points during the polymerization.

Furthermore, in order to prevent a deterioration in product quality as a result of using the reflux condenser, further addition of suspension agents or antifoaming agents, or adjustment of the rotational speed of the stirring blade inside the polymerization vessel, may also be conducted.

—Monomer

The monomer used in the present invention is either vinyl chloride or a monomer mixture comprising vinyl chloride as the primary component. A monomer mixture comprising vinyl chloride as the primary component comprises at least 50% by mass of vinyl chloride, as well as another monomer which is copolymerizable with the vinyl chloride. Examples of other monomers which are copolymerizable with vinyl chloride include vinyl esters such as vinyl acetate and vinyl propionate; acrylate esters or methacrylate esters such as methyl acrylate and ethyl acrylate; olefins such as ethylene and propylene; as well as other monomers such as maleic anhydride, acrylonitrile, styrene and vinylidene chloride. These monomers can be used either alone, or in combinations of two or more different monomers.

—Polymerization Initiator

There are no particular restrictions on the polymerization initiator used for initiating the polymerization in a process of the present invention, and the types of initiators used in conventional vinyl chloride-based polymer production are suitable. Specific examples of these polymerization initiators include peroxycarbonate compounds such as diisopropyl peroxydicarbonate, di-2-ethylhexyl peroxydicarbonate, diethoxyethyl peroxydicarbonate, and di-sec-butyl peroxydicarbonate; peroxy ester compounds such as t-butyl peroxypivalate, t-hexyl peroxypivalate, t-butyl peroxyneodecanoate, α-cumyl peroxyneodecanoate, t-butyl peroxyneoheptanoate, t-amyl peroxyneodecanoate, and 3-hydroxy-1,1-dimethylbutyl peroxyneodecanoate; and peroxides such as isobutyryl peroxide, acetylcyclohexylsulfonyl peroxide, 2,4,4-trimethylpentyl-2-peroxyphenoxy acetate, and 3,5,5-trimethylhexanoyl peroxide. These polymerization initiators can be used either alone, or in combinations of two or more different initiators. The quantity used is typically within a range from 0.01 to 1 part by mass, and preferably from 0.02 to 0.2 parts by mass, per 100 parts by mass of the monomer raw material. These polymerization initiators may be added either in solution form, having been diluted with an organic solvent, or in the form of an emulsion or suspension formed by dispersion within an aqueous medium. An aqueous emulsion is preferred. Preparation of an aqueous emulsion of the polymerization initiator can be achieved in the same manner as described for the aqueous emulsion of the high-activity initiator.

—Suspension Stabilizer

There are no particular restrictions on the suspension stabilizer used when polymerizing either vinyl chloride, or a monomer mixture comprising vinyl chloride, in an aqueous medium in accordance with a process of the present invention, and the types of stabilizers used in conventional vinyl chloride-based polymer production are suitable. Specific examples of these suspension stabilizers include water-soluble cellulose ethers such as methyl cellulose, hydroxyethyl cellulose, hydroxypropyl cellulose and hydroxypropylmethyl cellulose; partially saponified polyvinyl alcohols such as water-soluble partially saponified polyvinyl alcohol and oil-soluble partially saponified polyvinyl alcohol; and water-soluble polymers such as acrylic acid polymers and gelatin. These stabilizers can be used either alone, or in combinations of two or more different stabilizers. The total quantity added of these suspension stabilizers is typically set appropriately within a range from 0.02 to 1 part by mass per 100 parts by mass of the monomer.

—Other Additives

In the process of the present invention, if required, other additives typically used in the production of vinyl chloride-based polymers, such as polymerization degree regulators, chain transfer agents, and antistatic agents and the like may also be used.

Other conditions associated with the polymerization, such as the method of supplying the aqueous medium, the vinyl chloride or monomer mixture comprising vinyl chloride, the suspension stabilizer, and the polymerization initiator and the like to the polymerization vessel, as well as the relative proportions added and the polymerization degree, may be similar to conventional processes.

As follows is a more detailed description of the process of the present invention using a series of examples and a comparative example.

The polymerization conversion rate at any specific point during a polymerization conducted in either of the examples or the comparative example was determined by actually conducting the polymerization under the specified polymerization conditions, adding an antioxidant to the polymerization system at a specific time to halt the polymerization, measuring the quantity of polymer produced at that point, and then using this measured quantity to calculate the polymerization conversion rate at that point. A plurality of polymerization reactions were conducted under the same conditions, with the time until the polymerization was halted extended by 0.5 hours in each successive reaction, and the polymerization conversion rate was measured in each case. This method was used to establish, in advance, the relationship between reaction time and the polymerization conversion rate for each of the specific reaction conditions, and the polymerization conversion rate at any particular time was then specified on the basis of this relationship.

EXAMPLE 1

The following description is based on FIG. 1. With the valves 5 to 9 closed, a polymerization vessel 1 of internal capacity 2 m$^3$, fitted with a reflux condenser, was charged with 856 kg of deionized water, 206 g of a partially saponified polyvinyl alcohol with a saponification degree of 79.5 mol %, and 137 g of hydroxypropylmethyl cellulose with a methoxy substitution degree of 28.5% by mass and a hydroxypropoxy substitution degree of 8.9% by mass. Subsequently, the inside of the polymerization vessel 1 was degassed until the internal pressure reached 8 kPa, and 685 kg of vinyl chloride monomer was then added. With the mixture undergoing constant stirring, 760 g of a 50% by mass aqueous emulsion of di-2-ethylhexyl peroxydicarbonate (10-hour half life temperature at a concentration of 0.1 mol/L in benzene: 43.4° C.) was added as a polymerization initiator (1), while a temperature raising process was started by passing hot water through the jacket, and when the temperature inside the polymerization reaction vessel 1 reached 57.0° C., the polymerization was allowed to proceed with the temperature maintained at that level. When the temperature inside the polymerization vessel 1 reached 57° C., the valves 6 to 8 were opened, and the addition of deionized water was commenced from the water supply pipe 3, using a flow rate of 500 g/min·cm$^2$ through a cross-section of the high-activity initiator supply pipe 2. When the polymerization conversion rate reached 15%, heat removal using the reflux condenser was commenced, and the valve 5 was opened, thereby commencing addition to the polymerization vessel 1, from the high-activity initiator supply pipe 2, of a 15% by mass aqueous emulsion of isobutyryl peroxide (half life temperature as above: 32.5° C.) as a polymerization initiator (2). The quantity added of the 15% by mass aqueous emulsion of isobutyryl peroxide was 400 g, and the rate of addition was 6.7 g per minute. After addition of the predetermined quantity of isobutyryl peroxide, the valve 5 was closed, thereby halting addition of the isobutyryl peroxide. The polymerization conversion rate at this point was 40%. 10 minutes after halting the addition of the isobutyryl peroxide, the valves 6 and 8 were closed, thereby halting the addition of the deionized water. Subsequently, steam at a temperature of 240° C., which exhibited a pressure inside the steam cleaning pipe 4 with the valve 9 closed of 0.3 MPa·G, was introduced into the high-activity initiator supply pipe 2 by opening the valve 9, and after steam cleaning for 30 seconds, the valves 7 and 9 were closed. The polymerization reaction was then continued, and when the pressure inside the polymerization vessel 1 had fallen to 0.588 MPa·G. 294 g of a 35% by weight aqueous emulsion of triethylene glycol-bis[3-(3-t-butyl-5-methyl-4-hydroxyphenyl) propionate] was added as a polymerization inhibitor to halt the polymerization reaction, the unreacted monomer was recovered, the reaction mixture slurry was extracted from the polymerization vessel, and this slurry was then dewatered and dried, yielding a vinyl chloride-based polymer.

Following washing of the inside of the polymerization vessel with water, 5 consecutive batches were conducted using the same procedure described above. The level of fish eyes in the polymer produced from the final batch was measured using the method described below. The results are shown in Table 1. Furthermore, the polymerization time for the final batch, and the level of scale adhesion in the vicinity of the outlet of the high-activity initiator supply pipe 2 following completion of the final batch are also recorded in Table 1.

[Fish Eyes]

25 g of a mixture obtained by mixing together 100 parts by mass of the sample polymer, 50 parts by mass of dioctyl phthalate, 0.5 parts by mass of tribasic lead sulfate, 1.5 parts by mass of lead stearate, 0.1 parts by mass of titanium oxide, and 0.05 parts by weight of carbon black was kneaded for 5 minutes at 140° C. using a six inch kneading roll mill. The mixture was then molded into a sheet of width 10 mm and thickness 0.2 mm, and the number of transparent spots (fish eyes) per 100 cm² of the sheet was counted and recorded.

EXAMPLE 2

With the exceptions of altering the quantity added and the rate of addition of the isobutyryl peroxide aqueous emulsion of the polymerization initiator (2), and altering the polymerization conversion rate at the point where reflux condenser heat removal was commenced as shown in Table 1, a vinyl chloride-based polymer was produced in the same manner as the example 1, and then subjected to the same measurements. The results are shown in Table 1.

COMPARATIVE EXAMPLE 1

With the exceptions of not conducting the continuous water addition, nor the steam cleaning of the pipes, a vinyl chloride-based polymer was produced in the same manner as the example 1, and then subjected to the same measurements. The results are shown in Table 1.

TABLE 1

|  | Example 1 | Example 2 | Comparative example 1 |
|---|---|---|---|
| Polymerization initiator (1) | 760 g | 760 g | 760 g |
| Polymerization initiator (2) | 400 g | 800 g | 400 g |
| Continuous flow rate of deionized water (g/min · cm²) | 500 | 500 | none |
| Polymerization conversion rate (%) when reflux condenser heat removal commenced | 15 | 10 | 15 |
| Rate of addition of polymerization initiator (2) | 6.7 g/minute | 6.7 g/minute | 6.7 g/minute |
| Polymerization conversion rate (%) when addition of polymerization initiator (2) completed | 40 | 60 | 40 |
| Polymerization time | 4 hours 16 minutes | 3 hours 49 minutes | 4 hours 17 minutes |
| Fish eyes (number) | 8 | 10 | 35 |
| State of scale adhesion | Almost no scale adhesion | Almost no scale adhesion | Adhesion of hard scale |

(Notes)
Polymerization initiator (1): 50% by mass aqueous emulsion of di-2-ethylhexyl peroxydicarbonate
Polymerization initiator (2): 15% by mass aqueous emulsion of isobutyryl peroxide

The invention claimed is:

1. A process for producing a vinyl chloride-based polymer, wherein a suspension polymerization of either vinyl chloride monomer, or a mixture of vinyl chloride monomer and another copolymerizable monomer, is conducted in a polymerization vessel fitted with a reflux condenser, said process comprising:

(A) adding to a reaction mixture a high-activity, oil-soluble polymerization initiator, with a 10-hour half life temperature of no more than 40° C. at a concentration of 0.1 mol/L in benzene, for a specified time within a period from commencement of heat removal using said reflux condenser through to completion of polymerization, (B) adding water either continuously or intermittently to said reaction mixture through a supply pipe for said polymerization initiator, at least during a period from commencement of addition of said high-activity, oil-soluble polymerization initiator through to completion of said addition, and (C) passing steam through said supply pipe following completion of addition of said water.

2. The process according to claim 1, wherein a quantity added of said high-activity, oil-soluble polymerization initiator is within a range from 0.0001 to 0.2 parts by mass per 100 parts by mass of said monomer or monomer mixture.

3. The process according to either claim 1, wherein a rate of addition of said high-activity, oil-soluble polymerization initiator is within a range from 0.3 to 5% by mass of an entire quantity of said initiator per minute.

4. The process according to claim 1, wherein a water flow rate is at least 200 g/min·cm² through a cross-section of said supply pipe.

5. The process according to claim 1, wherein addition of said high-activity, oil-soluble polymerization initiator is commenced either simultaneously with commencement of heat reduction using said reflux condenser, or within 10 minutes of said commencement of heat reduction, and is completed prior to a polymerization conversion rate reaching 75%.

6. The process according to claim 1, wherein said copolymerizable monomer is at least one selected from the group consisting of vinyl esters, acrylate esters, methacrylate esters, olefins, maleic anhydride, acrylonitrile, styrene, and vinylidene chloride.

7. The process according to claim 1, wherein said high-activity, oil-soluble polymerization initiator is at least one selected from the group consisting of acetylcyclohexylsulfonyl peroxide, isobutyryl peroxide, α-cumyl peroxyneodecanoate, diisopropylbenzene, diallyl peroxycarbonate, and 3-hydroxy-1,1-dimethylbutyl peroxyneodecanoate.

8. The process according to claim 1, wherein a temperature of said steam is at least 120° C.

* * * * *